United States Patent [19]
Tucker

[11] 3,738,074
[45] June 12, 1973

[54] MOLDING RETAINER
[75] Inventor: Herbert D. Tucker, Rochester, Mich.
[73] Assignee: General Motors Corporation, Detroit, Mich.
[22] Filed: Nov. 13, 1969
[21] Appl. No.: 876,545

[52] U.S. Cl. .................... 52/718, 24/201 C, 24/73
[51] Int. Cl. ...................... E04f 19/02, E04f 13/15
[58] Field of Search .................................................
52/716–718, 290, 395, 403; 24/73 HS, 73 PM, 201 C, 259 PW

[56] References Cited
UNITED STATES PATENTS

| | | | |
|---|---|---|---|
| 2,894,298 | 7/1959 | Stahl | 52/716 |
| 3,130,822 | 4/1964 | Meyer | 24/73 HS |
| 3,197,935 | 8/1965 | Clancy et al. | 52/718 |

FOREIGN PATENTS OR APPLICATIONS

| | | | |
|---|---|---|---|
| 1,014,137 | 12/1965 | Great Britain | 52/718 |
| 1,252,603 | 12/1960 | France | 52/403 |

*Primary Examiner*—Henry C. Sutherland
*Assistant Examiner*—James L. Ridgill, Jr.
*Attorney*—Jean L. Carpenter and Arthur N. Krein

[57] ABSTRACT

A retainer for securing molding, such as a window garnish molding to a support panel of a vehicle body, the retainer including a pair of integrally hinged members adapted to engage the inner curved edges of a channel-shaped molding and a lateral tongue extending from each of the hinged members adapted to engage a molding support panel.

6 Claims, 7 Drawing Figures

INVENTOR.
Herbert D. Tucker
BY
Arthur N. Krein
ATTORNEY

INVENTOR.
Herbert D. Tucker
BY
Arthur N. Krein
ATTORNEY

MOLDING RETAINER

This invention relates to a molding retainer and, more particularly, to a retainer for securing a molding to a panel of a vehicle body or similar device.

Conventionally, moldings, such as window garnish moldings, have been fastened to a vehicle body either by retainers which are fastened to a panel of the vehicle body by screws or by retainers that snap into apertured openings in the panel.

It is, therefore, a primary object of this invention to improve molding retainers whereby the retainers can be preassembled with the moldings to be retained and then simply and effectively secured to the support panel without the aid of any special tools.

Another object of this invention is to provide a relatively simple retainer structure for fastening a molding to the end of a support panel.

These and other objects of the invention are attained by means of a molding retainer of flexible material having a pair of hinge members integrally hinged to each other along a common hinge line to provide an over-center snap feature. A lateral tongue extends from each of the hinge members to grip between them the sides of a support panel when the retainer is snapped over-center to a molding retaining position.

For a better understanding of the invention, as well as other objects and further features thereof, reference is had to the following detailed description of the invention to be read in connection with the accompanying drawings, wherein.

Figure 1:
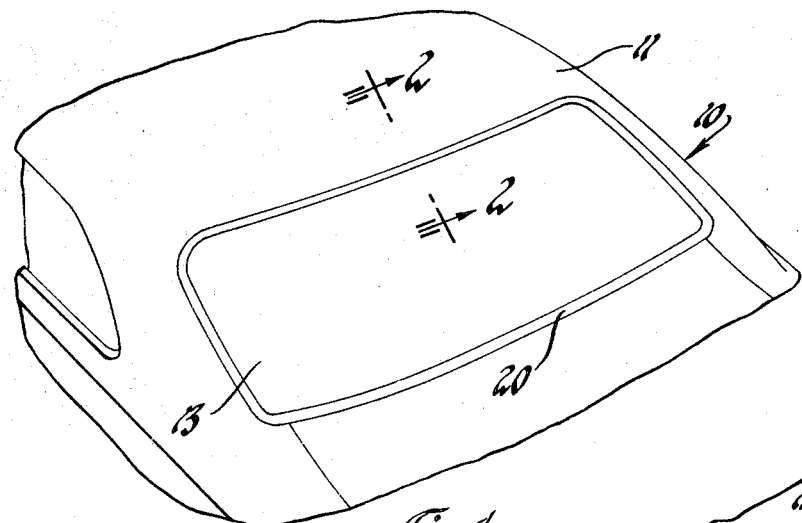
FIG. 1 is a partial rear perspective view of a vehicle body having the rear window garnish molding thereof secured to the rear window header by a retainer according to this invention.
Figure 2:
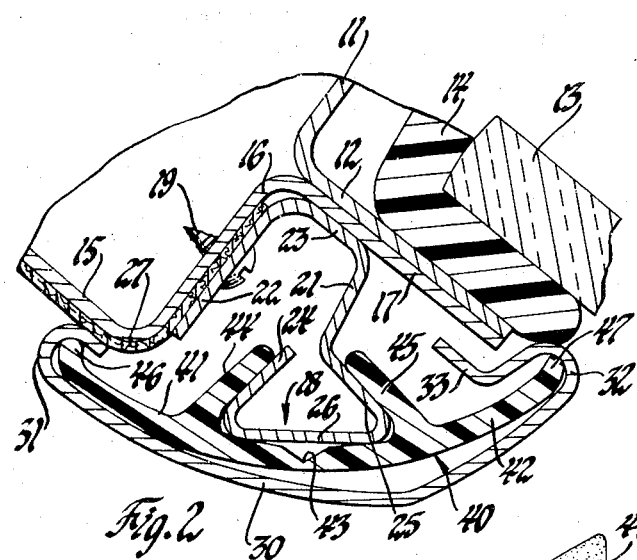
FIG. 2 is an enlarged sectional view taken along the line 2—2 of FIG. 1 with the retainer and molding in the installed position.
Figure 3:
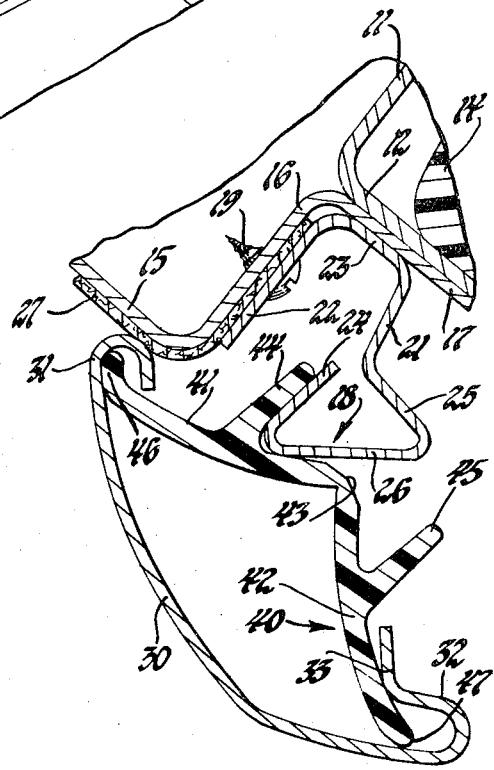
FIG. 3 is a view similar to FIG. 2 showing the retainer and molding in position prior to installation.

Referring now to the drawings, a vehicle body, generally designated 10, includes the roof panel 11. As shown in FIGS. 2 and 3, the rear edge portion of the roof panel 11 terminates in a depending lateral flange 12 to form part of a window well which receives rear window 13 retained in position by adhesive 14, as is well known in the art. A decorative molding 20, secured in a suitable manner covers the outer edge portion of the rear window 13 and adhesive 14.

The body or rear window header panel 15 includes a recurve flange 16 and flange 17, the latter being welded to flange 12 to provide a body pinch weld. A rebent flange 18 which can be formed as an integral part of the header panel 15 or, as shown, as a separate panel suitably secured as by screws 19 to the recurve flange 16, is used to provide a pinch support element for the retainer of the invention. For ease in manufacturing, the rebent flange 18 is part of a separate panel, as previously mentioned, bent to provide a U-shaped base, one leg 21 of which is integral with the rebent flange 18 and the other leg 22 serves as a base by which this structure is secured to recurve flange 16 with the web 23 of the U-shaped base abutting the terminal flange 17. The rebent flange 18 is triangular in shape with sides 24 and 25 and connecting base 26. With the rebent flange 18 as a separate element, it is preferable to secure it to the header panel after installation of the headlining 27 whereby the headlining can then be sandwiched between leg 22 and recurve flange 16.

As is conventional, the inner surface of the roof panel 11 is concealed by a headlining 27 which extends from the front window or windshield header, not shown, to the header panel 15 and is supported between these headers by conventional listing wires, not shown. When the headlining is mounted on the body, the front edge portion thereof is secured to the windshield header, the intermediate portion is secured to the listing wires, and then the headlining is pulled taut toward the rear of the vehicle body and cemented to the header panel 15 with the headlining extending to cover at least a portion of recurve flange 16. Since the headlining may extend over a substantial portion of recurve flange 16, the rebent flange 18 is preferably secured in place after the installation of the headlining. This end of the headlining and the curved flanged end of header panel 15 are thereafter covered by a molding 30 held in position by the retainer 40 of the invention.

The molding 30 of a suitable length is of general arcuate cross section opening to the curved flanged end of header panel 15 and, includes return bent flanges 31 and 32 at the edge portions thereof, the return bent flange 32 terminating in lateral flange 33 which in the installed position of the molding extends substantially parallel to flange 17 of header panel 15, as shown in FIG. 2.

Figure 4:
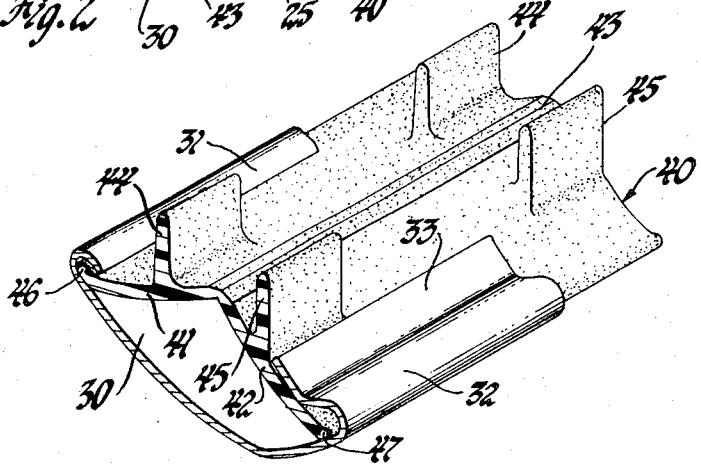
FIG. 4 is a perspective view of a portion of the retainer and molding assembly of FIG 3.

Referring now to the retainer 40 of the invention, as illustrated in FIGS. 2, 3 and 4, it is made of a suitable flexible material, for example, a polypropylene plastic material, and includes hinge members 41 and 42 which are integrally hinged to each other along a groove or hinge line 43 and in their free or molded state are in a partially folded position in relation to each other as shown in FIGS. 3 and 4. Relatively straight sided lateral extensions or clamp members 44 and 45, hereinafter referred to as lateral extensions, are provided integral with hinge members 41 and 42, respectively. As can be seen in FIGS. 3 and 4, the hinge members 41 and 42, when in their free state, are normally located in a partially folded position to one side of the retainer with the later extensions 44 and 45 in spaced apart rebent flange receiving relationship to each other, with the extent therebetween greater than the width of base 26 of the triangular-shaped rebent flange 18. In this partially folded position, the extent between the ends 46 and 47 of hinge members 41 and 42, respectively, is of a length to permit the retainer to be slipped between the return bent flanges 31 and 32 and into the concavity of molding 30 with very little additional folding of the hinge members while still permitting the retainer to support the molding in this preassembled condition.

In the assembly of the retainer and molding to the vehicle body, the retainer now supporting the molding is positioned with the inside surface of lateral extension 44 against side 24 and the inside adjacent portion of hinge member 41 against base 26 of the rebent flange 18. Thereafter, pressure is applied against the molding 30 which is resisted by the portion of hinge member 41 in contact with base 26 to cause hinge members 41 and 42 to unfold relative to each other about hinge line 43 and then partially fold or snap to the other side or over-center as the ends 46 and 47 move within the return bent flanges 31 and 32, respectively, with the lateral extensions 44 and 45 now biased toward each other to firmly grip the sides 24 and 25, respectively, of rebent flange 18 therebetween. The ends of the hinge members move into engagement with the inner surfaces of the return bent flanges of the molding and the normal bias of the hinge members in their now over-center position with respect to the hinge line securely retains the molding in the position shown in FIG. 2. In this over-center position, the extent between the bases of the lateral extensions 44 and 45 where they join their respective hinge members is greater than the extent of base 26 to permit these lateral extensions to be firmly biased against the sides of the rebent flange 18.

Figure 5:
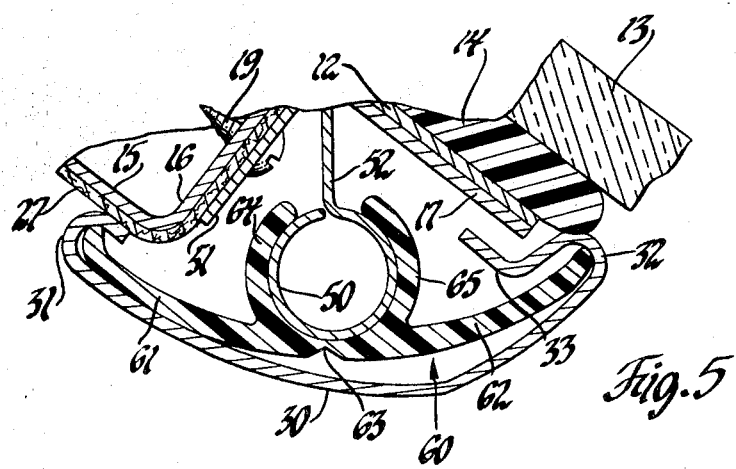
FIG. 5 is a view similar to FIG. 2 illustrating another embodiment of a retainer in the installed molding retaining position.
Figure 6:
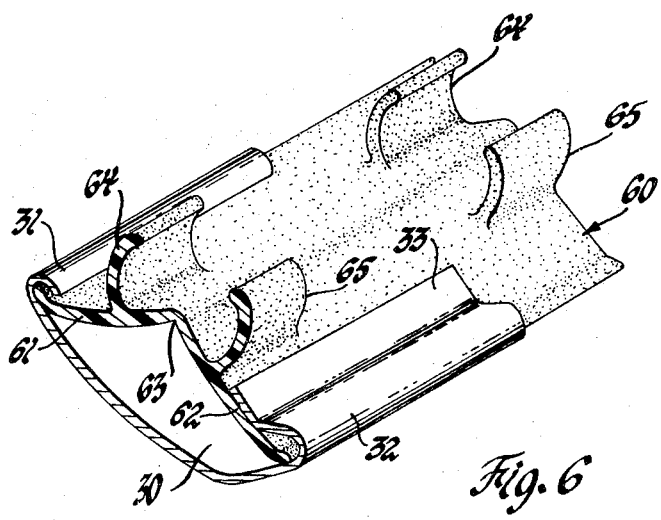
FIG. 6 is a perspective view of a portion of the retainer and molding assembly of FIG. 5; and, FIG. 7 is a view similar to FIG. 2 illustrating the retainer of this Figure as installed on a T-shaped rebent flange.

Referring now to FIGS. 5 and 6, where like numerals indicate like parts, there is illustrated another embodiment of a retainer, generally designated 60, which is adapted for use with a rebent flange 50 having a curved free end, such as the tubular configuration shown in FIG. 5. As illustrated in this Figure, rebent flange 50 is part of a separate panel bent to provide a base member 51 secured by screws 19 to recurve flange 16 of the header panel 15, a return leg 52 projecting at an acute angle from base member 51 and terminating in a curved end portion of tubular configuration, that is, rebent flange 50.

Retainer 60, also made of flexible material, includes hinge members 61 and 62 integrally hinged to each other along a groove or hinge line 63 and in their free or molded state are in a partially folded position in relation to each other as shown in FIG. 6. Curved lateral extensions or clamp members 64 and 65 are provided integral with hinge members 61 and 62, respectively. The opposed faces of the lateral extensions 64 and 65 are concave and of a size and radius so that in the installed position, as shown in FIG. 5, they will partially encircle the tubular rebent flange 50 with the opposed concave surfaces of the lateral extensions in firm engagement with the outer surface of rebent flange 50 as biased thereagainst by the installed over-center position of hinge members 61 and 62. In use, retainer 60 is preassembled to molding 30 and then installed on the rebent flange in a manner similar to that previously described in regard to retainer 40.

Figure 7:
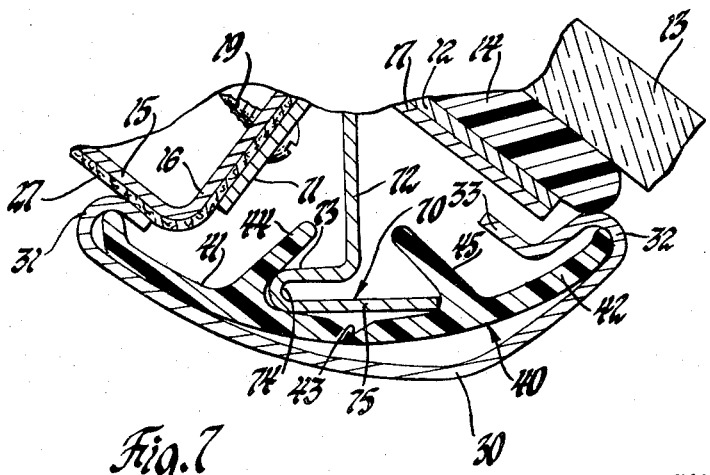

From the descriptions of retainers 40 and 60, it is apparent that the basic difference between these two retainers is in the configurations of their lateral extensions which are shaped to adequately grip the particular rebent flange on which it is to be applied and, accordingly, it is also apparent that these lateral extensions can be of any desired configuration to mate in their retaining position with the external configuration of the rebent flange which can also be of any suitable desired configuration. However, because of the pinching action of the lateral extensions as biased toward each other when the hinge members are snapped over-center it will permit some variation in the shape of the rebent flange for a particular configuration of the lateral extensions of a retainer. Thus, for example, there is illustrated in FIG. 7 the use of the embodiment of the retainer of FIGS. 2, 3 and 4 to secure molding 30 in place by attachment of the retainer 40 to a T-shaped rebent flange 70. As shown in this Figure, rebent flange 70 is part of a separate panel which is bent to provide base member 71 secured to the header panel 15 by screws 19 engaged in recurve flange 16, a return leg 72 projecting at an acute angle from base member 71 and terminating in the opensided T-shaped rebent flange 70 including lateral flange 73, recurve bend portion 74 and terminal flange 75. In this arrangement with hinge members 41 and 42 in the over-center installed position, as shown lateral extensions 44 and 45 are biased into engagement with the recurve bend portion 74 and the free end of terminal flange 75, respectively, with sufficient force to adequately retain molding 30 in the final assembled position even though the shape of the lateral extensions are not complementary to the shape of rebent flange 70.

Although each of the molding retainers, as shown in FIGS. 4 and 6, are provided with a plurality of spaced apart lateral extensions, it is to be appreciated, that the lateral extensions can be made continuous, if desired, corresponding in length to the length of the retainer. In addition, it is also obvious that a plurality of retainers constructed in accordance with the invention may be used to secure the moldings in place or, if desired, the retainers of the invention can be made as single continuous strip retainers of a length corresponding to the length of the molding to be retained.

WHAT IS CLAIMED IS:

1. A molding retainer for fastening an elongated generally transversely arcuate molding with return bent edge portions to a support panel having a terminal rebent flange, said retainer comprising a pair of hinged members integrally hinged together about a common grooved hinge line, each having integral lateral clamp means extending from one side thereof, said clamp means being adapted to engage therebetween opposite sides of the rebent flange of the support panel, said hinged members being normally biased in their free state about said grooved hinge line to a partially folded position with said clamp means in an open position relative to the rebent flange and being movable to an over-center, partially folded position about said grooved hinge line with said clamp means in a biased closed rebent flange engaging position, the extent between the edges of said hinge members when in said over-center, partially folded position being generally equal to the extent between the return bent edge portions of the molding.

2. A retainer for fastening an elongated generally transversely arcuate molding with return bent edge portions to a rebent flange of a panel, said retainer of flexible material comprising a hinge member including a first member and a second member integrally hinged together about a common grooved hinge line, an extension means integral with and extending laterally from said first member, an extension means integral with and extending laterally from said second member, said first member and said second member of said hinge member being normally biased in their free state to a partially folded position to one side of said retainer with said extensions spaced away from each other and being movable to a molding retaining over-center with respect to said grooved hinge line to a partially folded position with respect to each other with said extensions now biased toward each other to grip the rebent flange of the panel therebetween, the extent between the edges of said hinge member when in said molding retaining partially folded over-center position being generally equal to the extent between the return bent edge portions of the molding.

3. In a vehicle body having a flanged header member and flexible material covering the header member and having the edge portion thereof terminating at the flange thereof, the combination of an elongated rebent flange means secured at one end to the flange of the header member and having a free end portion extending outward from the header member, an elongated generally transversely arcuate molding having an extent between the edge portions thereof sufficient to conceal the edge portion of the flexible material and the flange of the header, and an elongated retainer of plastic material including a pair of integrally hinged members each having integral lateral clamp means extending from one side thereof, said hinged members being normally biased to a partially folded position to in turn bias said clamp means away from each other and being movable to an over-center partially folded position with respect to each other to bias said clamp means against opposite sides of said free end of said rebent flange means securing said retainer to said rebent flange means, the free ends of said hinge members engaging the inner surface of said edge portions of said molding to secure said molding on said retainer.

4. The combination according to claim 3 wherein said rebent flange means includes a triangular-shaped free end portion and wherein each of said clamp means of said retainer has a substantially flat rebent flange means engaging surface.

5. The combination according to claim 3 wherein said rebent flange means includes a tubular-shaped free end portion and wherein each of said clamp means of said retainer has a concave rebent flange means engaging surface.

6. The combination according to claim 3 wherein said clamp means of said retainer are provided with rebent flange means engaging surfaces of a shape to effectively pinch said free end portion of said rebent flange means between said clamp means.

* * * * *